(12) United States Patent  
Derby, V. et al.

(10) Patent No.: US 7,854,293 B2
(45) Date of Patent: Dec. 21, 2010

(54) STEERING OPERATED BY LINEAR ELECTRIC DEVICE

(75) Inventors: Harry L. Derby, V., Charlotte, NC (US); Martin M. Carlson, Tega Cay, SC (US); Christian Stanton Carver Bryant, Charlotte, NC (US); Kenneth R. Wilson, Stanley, NC (US); Scott Chartrand, Charlotte, NC (US)

(73) Assignee: Textron Innovations Inc., Providence, RI (US)

( * ) Notice: Subject to any disclaimer, the term of this patent is extended or adjusted under 35 U.S.C. 154(b) by 63 days.

(21) Appl. No.: 12/033,214

(22) Filed: Feb. 19, 2008

(65) Prior Publication Data

US 2008/0209880 A1 Sep. 4, 2008

Related U.S. Application Data

(60) Provisional application No. 60/902,248, filed on Feb. 20, 2007.

(51) Int. Cl.
*B62D 5/04* (2006.01)

(52) U.S. Cl. .................. 180/444; 180/443; 180/436; 56/10.1

(58) Field of Classification Search ............. 180/444, 180/443, 436, 438; 56/10.1–10.8, 11.8
See application file for complete search history.

(56) References Cited

U.S. PATENT DOCUMENTS

| 1,401,156 A | 12/1921 | Jenkins |
|---|---|---|
| 2,417,613 A | 3/1947 | Radabaugh |
| 2,523,014 A | 9/1950 | Gooch |
| 2,702,448 A | 2/1955 | Smith |
| 3,090,184 A | 5/1963 | Hadek |
| 3,103,090 A | 9/1963 | Campbell |
| 3,106,811 A | 10/1963 | Heth et al. |
| 3,217,824 A | 11/1965 | Jepson |
| 3,230,695 A | 1/1966 | West |
| 3,301,494 A | 1/1967 | Tornqvist |
| 3,339,353 A | 9/1967 | Schreyer |
| 3,404,518 A | 10/1968 | Kasper |
| 3,425,197 A | 2/1969 | Kita |
| 3,429,110 A | 2/1969 | Strasel |
| 3,472,005 A | 10/1969 | Profenna |
| 3,496,706 A | 2/1970 | Mattson |
| 3,511,033 A | 5/1970 | Strasel |

(Continued)

*Primary Examiner*—Lesley Morris
*Assistant Examiner*—Tashiana Adams
(74) *Attorney, Agent, or Firm*—Harness, Dickey & Pierce, P.L.C.

(57) ABSTRACT

A riding mower assembly may include a mower frame, first and second wheels, and a steering assembly. The steering assembly may include a steering frame member fixed to the mower frame, a first steering arm rotatably coupled to a first end of the steering frame member and having the first wheel coupled thereto, a second steering arm rotatably coupled to a second end of the steering frame member and having the second wheel coupled thereto, an actuation mechanism, and a cross-member. The actuation mechanism may include a first end coupled to the steering frame member and a second end coupled to the first steering arm. The actuation mechanism may include a motor having an actuation arm extending therefrom that rotates the first steering arm. The cross-member may have a first end coupled to the first steering arm and a second end coupled to the second steering arm.

15 Claims, 2 Drawing Sheets

U.S. PATENT DOCUMENTS

| | | | |
|---|---|---|---|
| 3,527,316 A * | 9/1970 | Jones, Jr. et al. | 180/437 |
| 3,570,226 A | 3/1971 | Haverkamp et al. | |
| 3,572,455 A | 3/1971 | Brueske | |
| 3,581,480 A | 6/1971 | O'Connor, III et al. | |
| 3,602,772 A | 8/1971 | Hundhausen et al. | |
| 3,603,065 A | 9/1971 | Weber | |
| 3,608,284 A | 9/1971 | Erdman | |
| 3,608,285 A | 9/1971 | Berk | |
| 3,612,573 A | 10/1971 | Hoffman | |
| 3,613,337 A | 10/1971 | Akgulian et al. | |
| 3,631,659 A | 1/1972 | Horowitz et al. | |
| 3,641,749 A | 2/1972 | Dwyer, Jr. et al. | |
| 3,650,097 A | 3/1972 | Nokes | |
| 3,668,499 A | 6/1972 | Malloy | |
| 3,668,844 A | 6/1972 | Akgulian et al. | |
| 3,668,884 A | 6/1972 | Nebgen | |
| 3,696,593 A | 10/1972 | Thorud et al. | |
| 3,698,523 A | 10/1972 | Bellinger | |
| 3,721,076 A | 3/1973 | Behrens | |
| 3,729,912 A | 5/1973 | Weber | |
| 3,731,469 A | 5/1973 | Akgulian et al. | |
| 3,732,671 A | 5/1973 | Allen et al. | |
| 3,732,673 A | 5/1973 | Winn, Jr. | |
| 3,742,685 A | 7/1973 | Lian et al. | |
| 3,759,019 A | 9/1973 | Wells | |
| 3,783,966 A * | 1/1974 | Campbell et al. | 180/433 |
| 3,796,277 A | 3/1974 | Gordon | |
| 3,800,480 A | 4/1974 | Keating | |
| 3,809,975 A | 5/1974 | Bartels | |
| 3,832,835 A | 9/1974 | Hall et al. | |
| 3,841,069 A | 10/1974 | Weck et al. | |
| 3,887,027 A * | 6/1975 | Allison | 180/421 |
| 3,895,481 A | 7/1975 | Olney et al. | |
| 3,910,016 A | 10/1975 | Saiia et al. | |
| 3,918,240 A | 11/1975 | Haffner et al. | |
| 3,924,389 A | 12/1975 | Kita | |
| 3,958,398 A | 5/1976 | Fuelling, Jr. et al. | |
| 3,992,858 A | 11/1976 | Hubbard et al. | |
| 3,999,643 A | 12/1976 | Jones | |
| 4,021,996 A | 5/1977 | Bartlett et al. | |
| 4,024,448 A | 5/1977 | Christianson et al. | |
| 4,048,366 A | 9/1977 | Kingsbury | |
| 4,064,680 A | 12/1977 | Fleigle | |
| 4,145,864 A | 3/1979 | Brewster, Jr. | |
| 4,161,858 A | 7/1979 | Gerrits | |
| 4,180,964 A | 1/1980 | Pansire | |
| 4,265,146 A | 5/1981 | Horrell | |
| 4,301,881 A | 11/1981 | Griffin | |
| 4,306,402 A | 12/1981 | Whimp | |
| 4,306,404 A | 12/1981 | Szymanis et al. | |
| 4,307,559 A | 12/1981 | Jupp et al. | |
| 4,312,421 A | 1/1982 | Pioch | |
| 4,318,266 A | 3/1982 | Taube | |
| 4,330,981 A | 5/1982 | Hall et al. | |
| 4,333,302 A | 6/1982 | Thomas et al. | |
| 4,335,569 A | 6/1982 | Keeney et al. | |
| 4,351,557 A | 9/1982 | Chary | |
| 4,354,569 A | 10/1982 | Eichholz | |
| 4,359,123 A * | 11/1982 | Haupt et al. | 180/436 |
| 4,370,846 A | 2/1983 | Arnold | |
| 4,395,865 A | 8/1983 | Davis, Jr. et al. | |
| 4,423,794 A | 1/1984 | Beck | |
| 4,430,604 A | 2/1984 | Loganbill et al. | |
| 4,475,615 A * | 10/1984 | Stanek | 180/437 |
| 4,479,346 A | 10/1984 | Chandler | |
| 4,487,006 A | 12/1984 | Scag | |
| 4,522,165 A | 6/1985 | Ogawa | |
| 4,550,926 A * | 11/1985 | MacIsaac | 280/5.509 |
| 4,559,768 A | 12/1985 | Dunn | |
| 4,562,589 A | 12/1985 | Warnaka et al. | |
| 4,589,249 A | 5/1986 | Walker et al. | |
| 4,642,976 A | 2/1987 | Owens | |
| 4,663,920 A | 5/1987 | Skovhoj | |
| 4,667,460 A | 5/1987 | Kramer | |
| 4,686,445 A | 8/1987 | Phillips | |
| 4,753,318 A | 6/1988 | Mizuno et al. | |
| 4,756,375 A | 7/1988 | Ishikura et al. | |
| 4,770,595 A | 9/1988 | Thompson et al. | |
| 4,815,259 A | 3/1989 | Scott | |
| 4,866,917 A | 9/1989 | Phillips et al. | |
| 4,870,811 A | 10/1989 | Steele | |
| 4,882,896 A | 11/1989 | Wilcox | |
| 4,893,688 A | 1/1990 | Morishita | |
| 4,897,013 A | 1/1990 | Thompson et al. | |
| 4,920,733 A | 5/1990 | Berrios | |
| 4,930,592 A | 6/1990 | Ohmura | |
| 4,943,758 A | 7/1990 | Tsurumiya | |
| 4,964,265 A | 10/1990 | Young | |
| 4,964,266 A | 10/1990 | Kolb | |
| 4,967,543 A | 11/1990 | Scag et al. | |
| 4,987,729 A | 1/1991 | Paytas | |
| 4,995,227 A | 2/1991 | Foster | |
| 5,042,236 A | 8/1991 | Lamusga et al. | |
| 5,042,239 A | 8/1991 | Card | |
| 5,062,322 A | 11/1991 | Sinko | |
| 5,069,022 A | 12/1991 | Vandermark | |
| 5,085,043 A | 2/1992 | Hess et al. | |
| 5,097,923 A | 3/1992 | Ziegler et al. | |
| 5,101,922 A | 4/1992 | Ohmura | |
| 5,123,234 A | 6/1992 | Harada et al. | |
| 5,133,174 A | 7/1992 | Parsons, Jr. | |
| 5,135,066 A | 8/1992 | Kashihara | |
| 5,140,249 A | 8/1992 | Linder et al. | |
| 5,150,021 A | 9/1992 | Kamono et al. | |
| 5,163,273 A | 11/1992 | Wojtkowski et al. | |
| 5,176,000 A | 1/1993 | Dauksis | |
| 5,203,147 A | 4/1993 | Long | |
| 5,204,814 A | 4/1993 | Noonan et al. | |
| 5,253,729 A | 10/1993 | Suzuki | |
| 5,261,213 A | 11/1993 | Humphrey | |
| 5,301,494 A | 4/1994 | Peot et al. | |
| 5,309,699 A | 5/1994 | Ehn, Jr. | |
| 5,319,368 A | 6/1994 | Poholek | |
| 5,323,593 A | 6/1994 | Cline et al. | |
| 5,330,138 A | 7/1994 | Schlessmann | |
| 5,343,680 A | 9/1994 | Reichen et al. | |
| 5,406,778 A | 4/1995 | Lamb et al. | |
| 5,415,245 A | 5/1995 | Hammond | |
| 5,459,984 A | 10/1995 | Reichen et al. | |
| 5,482,135 A | 1/1996 | Phillips et al. | |
| 5,540,037 A | 7/1996 | Lamb et al. | |
| 5,580,089 A * | 12/1996 | Kolka | 280/124.103 |
| 5,692,053 A | 11/1997 | Fuller et al. | |
| 5,794,422 A | 8/1998 | Reimers et al. | |
| 5,845,236 A | 12/1998 | Jolly et al. | |
| 5,921,343 A * | 7/1999 | Yamakaji | 180/436 |
| 6,039,009 A | 3/2000 | Hirose | |
| 6,044,922 A | 4/2000 | Field | |
| 6,082,084 A | 7/2000 | Reimers et al. | |
| 6,338,013 B1 | 1/2002 | Ruffner | |
| 6,357,768 B1 * | 3/2002 | Chan et al. | 280/124.106 |
| 6,449,934 B1 | 9/2002 | Reimers et al. | |
| 6,456,925 B1 * | 9/2002 | Romig | 701/93 |
| 6,491,133 B2 | 12/2002 | Yamada et al. | |
| 6,510,917 B2 * | 1/2003 | Cole | 180/437 |
| 6,604,348 B2 | 8/2003 | Hunt | |
| 6,644,004 B2 | 11/2003 | Reimers et al. | |
| 6,857,253 B2 * | 2/2005 | Reimers et al. | 56/10.6 |
| 2004/0004335 A1 * | 1/2004 | Rudder et al. | 280/86.751 |
| 2009/0098961 A1 * | 4/2009 | Hasegawa et al. | 474/61 |

* cited by examiner

STEERING OPERATED BY LINEAR ELECTRIC DEVICE

CROSS-REFERENCE TO RELATED APPLICATIONS

This application claims the benefit of U.S. Provisional Application No. 60/902,248, filed on Feb. 20, 2007. The disclosure of the above application is incorporated herein by reference.

FIELD

The present disclosure relates to steering mechanisms, and more specifically to steering mechanisms utilizing an electric linear actuator.

BACKGROUND

The statements in this section merely provide background information related to the present disclosure and may not constitute prior art.

Riding mowers typically include some form of steering device. These steering devices can include hydraulic cylinders and electric rotary motors for wheel turning operation. However, these steering devices can include complicated geometry including a large number of parts. Further, use of hydraulic cylinder devices can result in oil spillage, which can damage turf.

SUMMARY

A riding mower assembly may include a mower frame, first and second wheels, and a steering assembly. The steering assembly may include a steering frame member fixed to the mower frame, a first steering arm rotatably coupled to a first end of the steering frame member and having the first wheel coupled thereto, a second steering arm rotatably coupled to a second end of the steering frame member and having the second wheel coupled thereto, an actuation mechanism, and a cross-member. The actuation mechanism may include a first end coupled to the steering frame member and a second end coupled to the first steering arm. The actuation mechanism may include a motor having an actuation arm extending therefrom that rotates the first steering arm in a first rotational direction when extended and rotates the first steering arm in a second rotational direction opposite the first rotational direction when retracted. The cross-member may have a first end coupled to the first steering arm and a second end coupled to the second steering arm to translate rotation of the first steering arm to the second steering arm.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
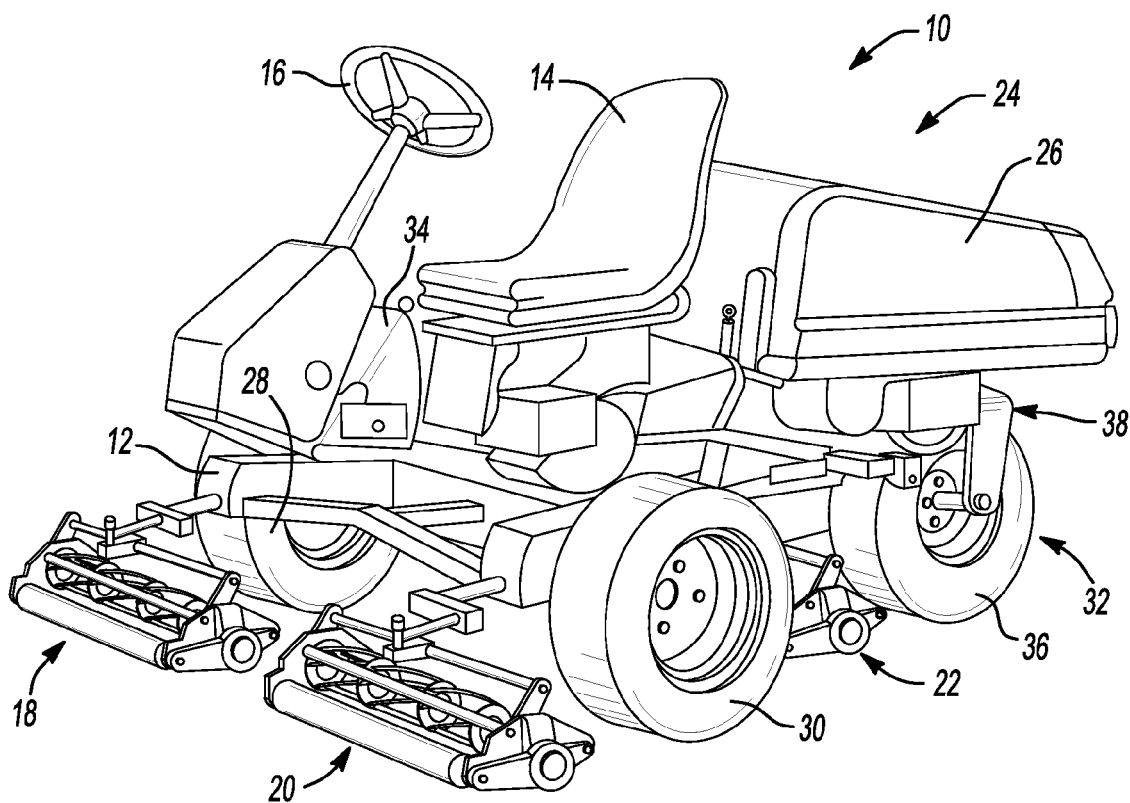
FIG. 1 is a perspective view of a riding mower according to the present disclosure.

The following description is merely exemplary in nature and is in no way intended to limit the present disclosure, application, or uses. Throughout this specification, like reference numerals will be used to refer to like elements.

Referring to FIG. 1, a riding mower assembly 10 can include a frame 12 supporting a seat 14 operable to support a passenger, a steering device 16 such as a steering wheel, a plurality of cutting units 18, 20, 22 coupled to frame 12, and a drive assembly 24. Drive assembly 24 can include a power unit 26, driven wheels 28, 30, and a steering assembly 32. Driven wheels 28, 30 can be driven by power unit 26 and can propel riding mower assembly 10.

Figure 2:
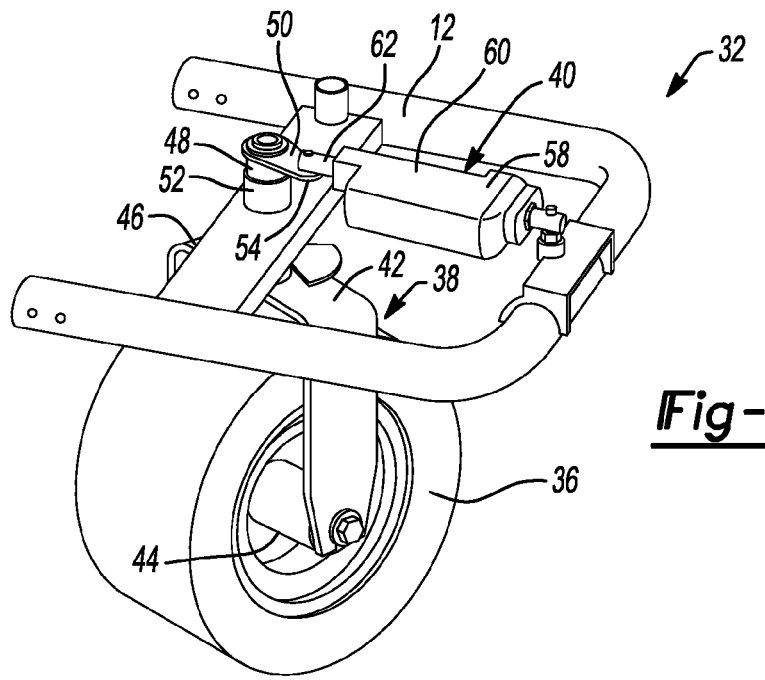
FIG. 2 is a fragmentary perspective view of the riding mower of FIG. 1.

With additional reference to FIG. 2, steering assembly 32 can include a controller 34, a steered wheel 36, a mounting assembly 38, and an electric linear actuator 40. In various embodiments, a variety of types of electric linear actuators can be used including lead screw actuators, ball screw actuators, planetary roller screw actuators, and belt driven actuators. Controller 34 can be in communication with steering device 16 and electric linear actuator 40 and can provide an input from steering device 16 to electric linear actuator 40. More specifically, controller 34 can be programmed and can provide a variable actuation speed of electric linear actuator 40. Controller 34 can be configured to control electric linear actuator 40 as well as other electrically operated components of riding mower assembly 10.

Steered wheel 36 can be rotatably coupled to mounting assembly 38. More specifically, mounting assembly 38 can include a bracket 42 having a wheel mounting portion 44 and a frame coupling portion 46 fixed for rotation with one another. Wheel mounting portion 44 can extend through a center of steered wheel 36, rotatably coupling steered wheel 36 to bracket 42. Frame coupling portion 46 can include a cylindrical member 48 having a flange 50 extending from an end thereof. Cylindrical member 48 can be rotatably coupled to frame 12. More specifically, cylindrical member 48 can be located within a bearing portion 52 of frame 12. Flange 50 can be fixed for rotation with cylindrical member 48 and can extend radially outwardly therefrom forming a moment arm. Flange 50 can further include a mounting aperture 54 extending therethrough for coupling mounting assembly 38 to electric linear actuator 40.

Electric linear actuator 40 can include a housing 58 containing an electric motor 60 and an actuation arm 62. Housing 58 can be fixed to frame 12 at a first end and actuation arm 62 can extend from housing 58 a second end thereof. Electric motor 60 can be coupled to a first end of actuation arm 62 and can selectively extend and retract actuation arm 62. More specifically, electric motor 60 can linearly displace actuation arm 62 relative to housing 58, and therefore frame 12. A second end of actuation arm 62 can be coupled to mounting assembly 38. More specifically, second end of actuation arm 62 can include a pin member (not shown) extending therefrom and into mounting aperture 54 in flange 50. The pin member can be rotatably disposed within mounting aperture 54.

In operation, when steering device 16 is actuated, a signal can be sent to motor controller 34 and then from motor controller 34 to electric linear actuator 40. Electric motor 60 can be operated based on the signal received from motor controller 34. More specifically, actuation arm 62 can be linearly extended or retracted based on the desired turning of steered wheel 36. Extension or retraction of actuation arm 62 can cause rotation of mounting assembly 38, and therefore steered wheel 36. More specifically, actuation arm 62 can act on flange 50, causing rotation of flange 50 about bearing portion 52 of frame 12.

Figure 3:
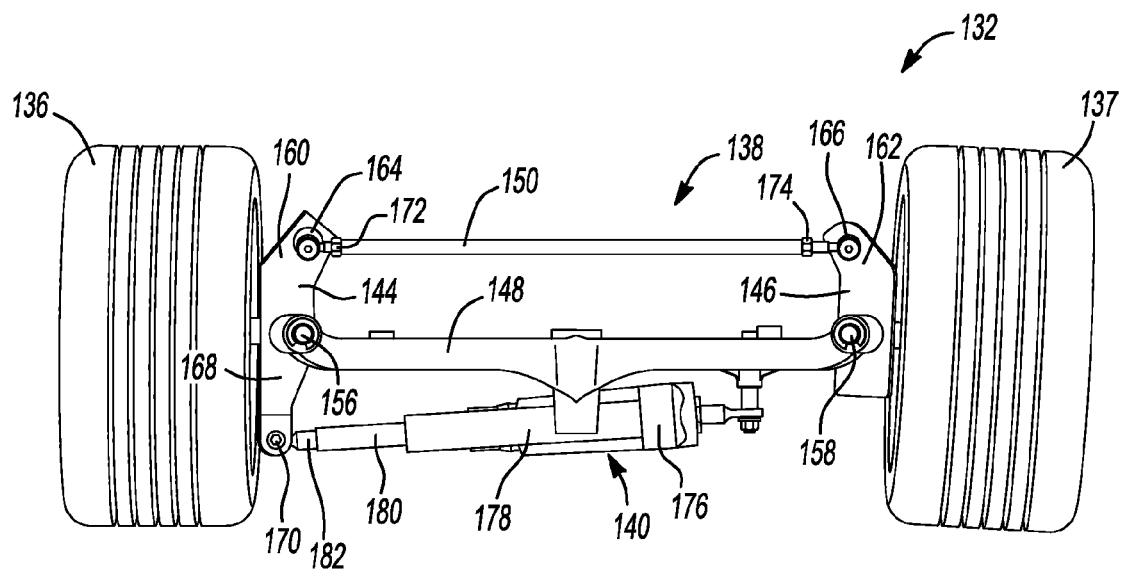
FIG. 3 is a top plan view of an alternate steering assembly for a riding mower according to the present disclosure.
Figure 4:
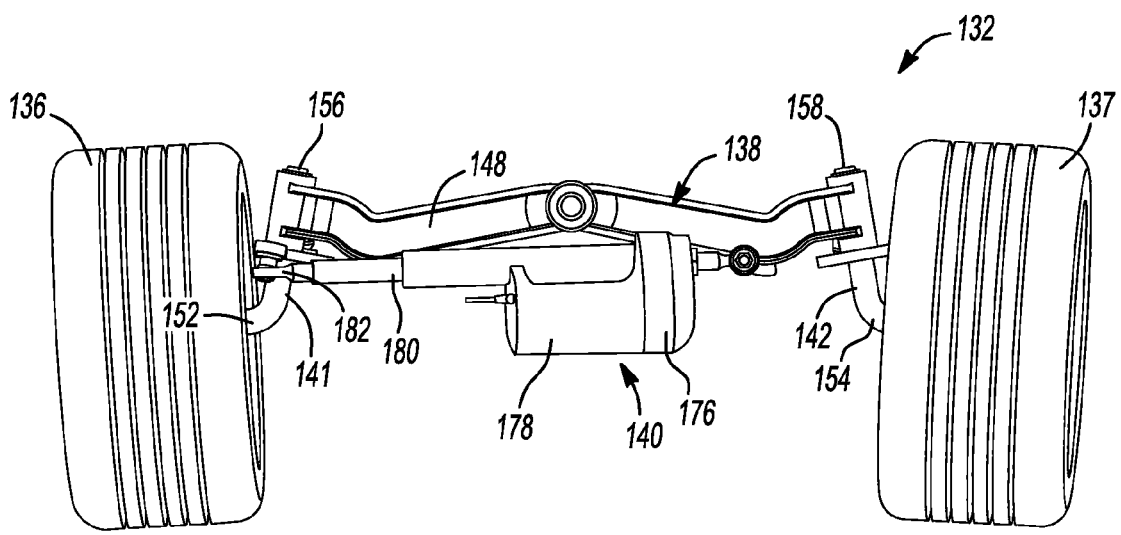
FIG. 4 is a front plan view of the steering assembly of FIG. 3.

With reference to FIGS. 3-4, steering assembly 132 is shown according to various embodiments. Steering assembly 132 can be used in combination with a riding mower assembly generally similar to riding mower assembly 10 in place of steering assembly 32. Steering assembly 132 can include a controller (not shown) similar to controller 34 (shown in FIG. 1), first and second steered wheels 136, 137, a mounting assembly 138, and an electric linear actuator 140 in communication with the controller.

Mounting assembly 138 can include first and second wheel mounting brackets 141, 142, first and second flanges 144, 146, a frame member 148, and a cross-member 150. First and second wheel mounting brackets 141, 142 can each include first ends 152, 154 having first and second steered wheels 136, 137 rotatably coupled thereto and second ends 156, 158 rotatably coupled to frame member 148.

First and second flanges 144, 146 can extend from second ends 156, 158 of first and second wheel mounting brackets 141, 142 and can be fixed for rotation therewith. First and second flanges 144, 146 can include first and second arms 160, 162 extending radially outwardly from second ends 156, 158 forming moment arms for rotation of first and second wheel mounting brackets 141, 142 relative to frame member 148, as discussed below. First and second arms 160, 162 can extend at an angle inwardly toward one another, forming an Ackerman steering geometry. First and second arms 160, 162 can each include a mounting aperture 164, 166 extending therethrough. First flange 144 can additionally include an actuation arm 168 extending generally opposite first arm 160. Actuation arm 168 can also include a mounting aperture 170 extending therethrough. Actuation arm 168 and mounting aperture 170 can be located axially outwardly relative to second end 156 of first wheel mounting bracket 141 and axially outwardly relative to mounting aperture 164 in first arm 160.

Frame member 148 can be fixed to the vehicle frame (such as frame 12 shown in FIG. 1) and can extend between first and second wheels 136, 137. Cross-member 150 can be a fixed length and can extend between and be coupled to first and second arms 160, 162 at first and second ends 172, 174 thereof. More specifically, first and second ends 172, 174 can be rotatably disposed within mounting apertures 164, 166.

Electric linear actuator 140 can be fixed to frame member 148. More specifically, electric linear actuator 140 can include a housing 176 containing an electric motor 178 and an actuation arm 180. Housing 176 can be fixed to frame member 148 and actuation arm 180 can extend from housing 176. Electric motor 178 can be coupled to a first end of actuation arm 180 and can selectively extend and retract actuation arm 180. More specifically, electric motor 178 can linearly displace actuation arm 180 relative to housing 176, and therefore frame member 148. A second end 182 of actuation arm 180 can be rotatably coupled to actuation arm 168 at mounting aperture 170.

As discussed above, electric linear actuator 140 can be actuated based on an input from a controller resulting from an input from a steering device. Electric motor 178 can be operated based on the signal received from the motor controller. More specifically, actuation arm 180 can be linearly extended or retracted based on the desired turning of first and second steered wheels 136, 137. Extension or retraction of actuation arm 180 can cause rotation of first and second wheel mounting brackets 141, 142, and therefore first and second steered wheels 136, 137. More specifically, actuation arm 180 can act on actuation arm 168, causing rotation of first flange 144. Rotation of first flange 144 can be translated to second flange 146 through cross-member 150.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A steering assembly comprising:
   a frame member fixed to a riding mower;
   a first steering arm having a first end and a second end rotatably coupled to a first end of said frame member and having a first wheel coupled thereto said first steering arm rotatably coupled to said frame member at a first location between said first and second ends;
   a second steering arm rotatably coupled to a second end of said frame member and having a second wheel coupled thereto wherein said first end of said first steering arm is located axially inwardly relative to said second end of said first steering arm in a direction toward said second steering arm;
   an actuation mechanism including a first end coupled to said frame member and a second end coupled to said first steering arm, said actuation mechanism including a motor having an actuation arm extending therefrom that rotates said first steering arm in a first rotational direction when extended and rotates said first steering arm in a second rotational direction opposite the first rotational direction when retracted; and
   a cross-member having a first end coupled to said first steering arm and a second end coupled to said second steering arm to translate rotation of said first steering arm to said second steering arm.

2. The steering assembly of claim 1, wherein said motor is an electric motor.

3. The steering assembly of claim 1, wherein said motor is coupled to said frame member and said actuation arm is coupled to said first steering arm.

4. The steering assembly of claim 1, wherein said second end of said first steering arm is located axially outwardly relative to said first location in a direction toward said second steering arm.

5. The steering assembly of claim 1, wherein said first steering arm includes a first end extending toward a first end of said second steering arm, said cross-member coupled to said first end of said first steering arm and said first end of said second steering arm.

6. The steering assembly of claim 1, wherein said actuation arm is linearly displaceable between the extended and retracted positions.

7. A steering assembly comprising:
   a frame member to a riding mower;
   a first steering arm including first and second ends, said first steering arm rotatably coupled to said frame member at a first location between said first and second ends and adapted to have a first wheel coupled thereto;
   a second steering arm rotatably coupled to said frame member and adapted to have a second wheel coupled thereto, said first end of said first steering arm located axially inwardly relative to said second end in a direction toward said second steering arm wherein said second end of said first steering arm is located axially outwardly relative to said first location in a direction toward said second steering arm;

an actuation mechanism including a first end coupled to said frame member and a second end coupled to said first steering arm, said actuation mechanism including a motor having an actuation arm extending therefrom that is linearly displaceable between extended and retracted positions, said actuation arm rotating said first steering arm in a first rotational direction when extended and rotating said first steering arm in a second rotational direction opposite the first rotational direction when retracted; and a cross-member having a first end coupled to said first end of said first steering arm and a second end coupled to said second steering arm to translate rotation of said first steering arm to said second steering arm.

8. The steering assembly of claim 7, wherein said motor is an electric motor.

9. The steering assembly of claim 7, wherein said motor is coupled to said frame member and said actuation arm is coupled to said first steering arm.

10. A riding mower assembly comprising:

a mower frame;

first and second wheels; and a steering assembly including:

a steering frame member fixed to said mower frame;

a first steering arm having a first end and a second end rotatably coupled to a first end of said steering frame member and having said first wheel coupled thereto said first steering arm rotatably coupled to said steering frame member at a first location between said first and second ends;

a second steering arm rotatably coupled to a second end of said steering frame member and having said second wheel coupled thereto wherein said first end of said first steering arm is located axially inwardly relative to said second end of said first steering arm in a direction toward said second steering arm;

an actuation mechanism including a first end coupled to said steering frame member and a second end coupled to the second end said first steering arm, said actuation mechanism including a motor having an actuation arm extending therefrom that rotates said first steering arm in a first rotational direction when extended and rotates said first steering arm in a second rotational direction opposite the first rotational direction when retracted; and a cross member having a first end coupled, to the first end of the first steering arm and a second end coupled to the second steering arm to translate rotation of said first steering arm to said second steering arm.

11. The riding mower assembly of claim 10, wherein said motor is an electric motor.

12. The riding mower assembly of claim 10, wherein said motor is coupled to said steering frame member and said actuation arm is coupled to said first steering arm.

13. The riding mower assembly of claim 10, wherein said second end of said first steering arm is located axially outwardly relative to the first location in a direction toward said second steering arm.

14. The riding mower assembly of claim 10, wherein said first steering arm includes a first end extending toward a first end of said second steering arm, said cross-member coupled to said first end of said first steering arm and said first end of said second steering arm.

15. The riding mower assembly of claim 10, wherein said actuation arm is linearly displaceable between the extended and retracted positions.

* * * * *

UNITED STATES PATENT AND TRADEMARK OFFICE
CERTIFICATE OF CORRECTION

PATENT NO. : 7,854,293 B2
APPLICATION NO. : 12/033214
DATED : December 21, 2010
INVENTOR(S) : Harry Derby, V et al.

Page 1 of 1

It is certified that error appears in the above-identified patent and that said Letters Patent is hereby corrected as shown below:

Column 4, line 58 (application page 4, line 2) "member to a" should be --member fixed to a--.

Column 6, line 7 (application page 6, line 15) "end said first" should be --end of said first--.

Signed and Sealed this
Twenty-second Day of February, 2011

David J. Kappos
*Director of the United States Patent and Trademark Office*